United States Patent
Brown et al.

(10) Patent No.: US 9,845,728 B2
(45) Date of Patent: Dec. 19, 2017

(54) FORMING A NACELLE INLET FOR A TURBINE ENGINE PROPULSION SYSTEM

(71) Applicant: Rohr, Inc., Chula Vista, CA (US)

(72) Inventors: Keith T. Brown, Bonita, CA (US); Vijay V. Pujar, San Diego, CA (US); Russell B. Hayes, Escondido, CA (US); David L. Rose, Cardiff-by-the-Sea, CA (US)

(73) Assignee: Rohr, Inc., Chula Vista, CA (US)

( * ) Notice: Subject to any disclaimer, the term of this patent is extended or adjusted under 35 U.S.C. 154(b) by 234 days.

(21) Appl. No.: 14/884,206

(22) Filed: Oct. 15, 2015

(65) Prior Publication Data

US 2017/0107905 A1 Apr. 20, 2017

(51) Int. Cl.
*B23K 20/12* (2006.01)
*F02C 7/04* (2006.01)
(Continued)

(52) U.S. Cl.
CPC .............. *F02C 7/04* (2013.01); *B23K 20/126* (2013.01); *B23K 20/129* (2013.01); *B64D 33/02* (2013.01); *F01D 25/24* (2013.01); *B64D 2033/0206* (2013.01); *B64D 2033/0226* (2013.01); *B64D 2033/0233* (2013.01); *F05D 2220/323* (2013.01); *F05D 2230/239* (2013.01); *F05D 2230/60* (2013.01); *F05D 2300/10* (2013.01)

(58) Field of Classification Search
CPC ... F02C 7/04; B64D 33/02; B64D 2033/0233; B64D 2033/0206; B64D 2033/0226; B23K 20/129; B23K 20/122–20/128; B23K 2201/001; F01D 25/24; F05D 2220/323; F05D 2230/60; F05D 2300/10; F05D 2230/239
USPC .................................................. 228/112.1, 2.1
See application file for complete search history.

(56) References Cited

U.S. PATENT DOCUMENTS 2,326,430 A 8/1943 Blanchard
3,879,941 A * 4/1975 Sargisson ............... B64D 33/02
                                                                137/15.1

(Continued)

FOREIGN PATENT DOCUMENTS

DE   102007023151   11/2008
FR   2943317        9/2010
JP   10230375       9/1998

OTHER PUBLICATIONS

Boehm "New Engineering Processes in Aircraft Construction: Application of Laser-Beam and Friction Stir Welding", Glass Physics and Chemistry, vol. 31, No. 1, Jan. 1, 2005, pp. 27-29.

(Continued)

*Primary Examiner* — Kiley Stoner
(74) *Attorney, Agent, or Firm* — O'Shea Getz P.C.

(57) ABSTRACT

Methods are provided forming a metallic nacelle inlet structure for a turbine engine aircraft propulsion system with an axis. The nacelle inlet structure includes an inlet lip portion and an outer barrel portion. One of the method may include steps of: forming the inlet lip portion; forming the outer barrel portion; arranging the inlet lip portion axially adjacent the outer barrel portion; and friction stir welding the inlet lip portion to the outer barrel portion to provide a circumferentially extending weld joint between the inlet lip portion and the outer barrel portion.

20 Claims, 12 Drawing Sheets

(51) Int. Cl.
*F01D 25/24* (2006.01)
*B64D 33/02* (2006.01)

(56) References Cited

U.S. PATENT DOCUMENTS

| | | | |
|---|---|---|---|
| 5,114,103 A * | 5/1992 | Coffinberry | B64C 21/06 244/118.5 |
| 6,158,957 A | 12/2000 | Marcin et al. | |
| 7,070,391 B2 | 7/2006 | Weisse | |
| 7,172,012 B1 | 2/2007 | Memmen | |
| 7,240,821 B2 | 7/2007 | Talwar | |
| 7,334,333 B2 | 2/2008 | Palazzini et al. | |
| 7,340,933 B2 | 3/2008 | Stewart | |
| 7,416,105 B2 | 8/2008 | Pitt et al. | |
| 7,438,527 B2 | 10/2008 | Albert et al. | |
| 7,464,852 B2 | 12/2008 | Waldron et al. | |
| 7,967,240 B2 * | 6/2011 | Sanders | B21D 26/055 123/41.7 |
| 2002/0066768 A1 * | 6/2002 | Foster | B23K 20/129 228/112.1 |
| 2002/0139899 A1 | 10/2002 | Porte | |
| 2003/0075300 A1 | 4/2003 | Shah et al. | |
| 2004/0020629 A1 | 2/2004 | Shah et al. | |
| 2004/0144831 A1 * | 7/2004 | Odajima | B23K 20/122 228/112.1 |
| 2005/0121167 A1 | 6/2005 | Marcin, Jr. et al. | |
| 2005/0211408 A1 | 9/2005 | Bullied et al. | |
| 2005/0254955 A1 * | 11/2005 | Helder | B23K 20/122 416/233 |
| 2005/0274482 A1 | 12/2005 | Marcin, Jr. et al. | |
| 2006/0021730 A1 | 2/2006 | Marcin, Jr. | |
| 2007/0074839 A1 | 4/2007 | Turkington et al. | |
| 2007/0095501 A1 | 5/2007 | Beals et al. | |
| 2008/0011445 A1 | 1/2008 | Beals et al. | |
| 2008/0169270 A1 | 7/2008 | Parkos et al. | |
| 2008/0308610 A1 | 12/2008 | Watson et al. | |
| 2008/0311421 A1 | 12/2008 | Watson et al. | |
| 2012/0070686 A1 * | 3/2012 | Ren | B23K 20/1275 428/638 |
| 2012/0126062 A1 | 5/2012 | Stewart | |
| 2013/0240609 A1 * | 9/2013 | Sanders | B21D 26/021 228/114 |
| 2014/0147269 A1 * | 5/2014 | Porte | F02C 7/04 415/213.1 |
| 2015/0314850 A1 * | 11/2015 | Lumbab | B64D 33/02 415/215.1 |
| 2016/0137291 A1 * | 5/2016 | Brown | B64C 21/06 415/116 |
| 2016/0144949 A1 * | 5/2016 | Kestler | B64D 33/02 244/53 B |
| 2016/0153287 A1 * | 6/2016 | Roach | C25D 7/00 415/119 |
| 2016/0159488 A1 * | 6/2016 | Roach | B29D 22/00 416/245 R |
| 2016/0160863 A1 * | 6/2016 | Roach | B32B 27/281 415/119 |
| 2016/0160869 A1 * | 6/2016 | Roach | F04D 29/023 415/200 |
| 2016/0169012 A1 * | 6/2016 | DaCunha | C25D 5/022 416/241 R |
| 2016/0251085 A1 * | 9/2016 | Stark | B64D 29/00 244/53 R |
| 2016/0375988 A1 * | 12/2016 | Brown | B64C 21/06 244/53 B |
| 2016/0377090 A1 * | 12/2016 | Brown | F04D 29/526 415/9 |

OTHER PUBLICATIONS

EP search report for EP16194081.2 dated Feb. 24, 2017.

* cited by examiner

FIG. 13

FORMING A NACELLE INLET FOR A TURBINE ENGINE PROPULSION SYSTEM

BACKGROUND OF THE INVENTION

1. Technical Field

This disclosure relates generally to an aircraft propulsion system and, more particularly, to a nacelle inlet for an aircraft propulsion system and a method for forming that nacelle inlet.

2. Background Information

A typical nacelle inlet for an aircraft propulsion system includes a plurality of separate components which are mechanically fastened together to form a single unit. For example, an annular inlet lip may be fastened axially to a tubular outer barrel. Furthermore, the inlet lip and the outer barrel may each be constructed from an array of arcuate segments which are fastened circumferentially to one another. Typically, the nacelle inlet is formed with such axial and arcuate segments to facilitate lower manufacturing costs as well as a byproduct of size restraints of manufacturing materials. While such nacelle inlet constructions have various advantages, there is still a need for a lighter weight and more aerodynamically efficient nacelle inlet.

SUMMARY OF THE DISCLOSURE

According to an aspect of the disclosure, a method is provided for forming a metallic nacelle inlet structure for a turbine engine aircraft propulsion system with an axis, where the nacelle inlet structure includes an inlet lip portion and an outer barrel portion. The method includes steps of: forming the inlet lip portion; forming the outer barrel portion; arranging the inlet lip portion axially adjacent the outer barrel portion; and friction stir welding the inlet lip portion to the outer barrel portion to provide a circumferentially extending weld joint between the inlet lip portion and the outer barrel portion.

According to another aspect of the disclosure, another method is provided for forming a metallic nacelle inlet structure for a turbine engine aircraft propulsion system with an axis, where the nacelle inlet structure comprising an inlet lip portion and an outer barrel portion. The method includes steps of: arranging the inlet lip portion axially adjacent the outer barrel portion; and friction stir welding the inlet lip portion to the outer barrel portion to provide a weld joint between the inlet lip portion and the outer barrel portion. The friction stir welding is performed using a rotating tool located radially within the inlet lip portion and the outer barrel portion.

The nacelle inlet structure may have a smooth, seamless outer surface at the weld joint.

The method may include a step of performing a finishing process to the weld joint to facilitate in provision of the smooth, seamless outer surface at the weld joint.

The friction stir welding may be performed using a rotating tool located radially within the inlet lip portion and the outer barrel portion.

The method may include a step of disposing a support device radially outside of and abutted against the inlet lip portion and the outer barrel portion during the friction stir welding.

The forming of the inlet lip portion may include shaping material into an annular or parti-annular body with a cupped sectional geometry.

The forming of the outer barrel portion may include shaping material into a tubular or parti-tubular body.

The nacelle inlet structure may include a component and a land which is thicker than another axially adjacent region of the nacelle inlet structure. The land may be configured integral with the inlet lip portion or the outer barrel portion. The component may be mechanically fastened to the land.

The inlet lip portion may be configured with an inner lip portion and an outer lip portion that axially overlaps and circumscribes the inner lip portion. The friction stir welding may include friction stir welding an axial aft end region of the outer lip portion to an axial forward end region of the outer barrel portion.

The axial aft end region may be thicker than another axially adjacent region of the outer lip portion.

The method may include steps of: disposing a bulkhead radially between the inner lip portion and the outer lip portion; and bonding the bulkhead to the outer lip portion. The bonding may include friction stir welding, adhering or otherwise bonding.

The method may include steps of: perforating the outer lip portion to provide an array of perforations; disposing a plenum structure radially within the outer lip portion; and bonding the plenum structure to the outer lip portion. The plenum structure may form a plenum with at least the outer lip portion. The plenum may be fluidly coupled with the array of perforations.

The method may include steps of: perforating the outer barrel portion to provide an array of perforations; disposing a plenum structure radially within the outer barrel portion; and bonding the plenum structure to the outer barrel portion. The plenum structure may form a plenum with at least the outer barrel portion. The plenum may be fluidly coupled with the array of perforations.

The bonding may include friction stir welding. A weld joint between the plenum structure and the outer barrel portion and the weld joint between the inlet lip portion and the outer barrel portion may be concurrently formed and part of a common weld joint.

The inlet lip portion may include a first metal and the outer barrel portion comprises a second metal that is different than the first metal. Alternatively, the inlet lip portion and the outer barrel portion may include a common metal.

A weld joint between the plenum structure and the inlet lip (e.g., the outer lip portion) and/or the outer barrel portion may be formed by friction stir welding. The weld joint may extend circumferentially between the plenum structure and the inlet lip and/or the outer barrel.

A plurality of weld joints between the plenum structure and the inlet lip (e.g., the outer lip portion) and/or the outer barrel portion may be formed by friction stir spot welding. Each of these weld joints may be a discrete weld joint separated by an un-welded seam between the plenum structure and the inlet lip and/or the outer barrel portion.

The friction stir welding may be performed using a rotating tool located radially within the inlet lip portion and/or the outer barrel portion and the plenum structure. A support device may be disposed radially outside of and abutted against the inlet lip portion and/or the outer barrel portion during the friction stir welding of the plenum structure.

A bulkhead may be disposed radially on the inlet lip portion (e.g., the outer lip portion) and/or the outer barrel portion. The bulkhead may be attached to the inlet lip and/or outer barrel with a plurality of weld joints using friction stir spot welding.

The foregoing features and the operation of the invention will become more apparent in light of the following description and the accompanying drawings.

DETAILED DESCRIPTION OF THE INVENTION

The present disclosure includes methods for forming a nacelle inlet. This nacelle inlet is configured for a turbine engine aircraft propulsion system. Examples of such a propulsion system include, but are not limited to, a turbofan propulsion system and a turbojet propulsion system.

The nacelle inlet is configured to promote laminar flow over an aerodynamic exterior and radially outer surface thereof by reducing or eliminating interruptions in that outer surface, or at least a forward axial portion thereof. The nacelle inlet, for example, may be configured without circumferentially extending seams in the outer surface. The nacelle inlet may also be configured without, or substantially reducing the number of, fasteners (e.g., rivets, screws, bolts, etc.) interrupting the outer surface. Such interruptions, if present in the outer surface and not flush, will cause the laminar flow to trip into turbulent flow.

The nacelle inlet may also be configured with an active laminar flow control (ALFC) system, an exemplary embodiment of which is described below. However, the present disclosure is not limited to such ALFC system configurations. The nacelle inlet, for example, may be configured for passive laminar flow control (PLFC).

Figure 1:
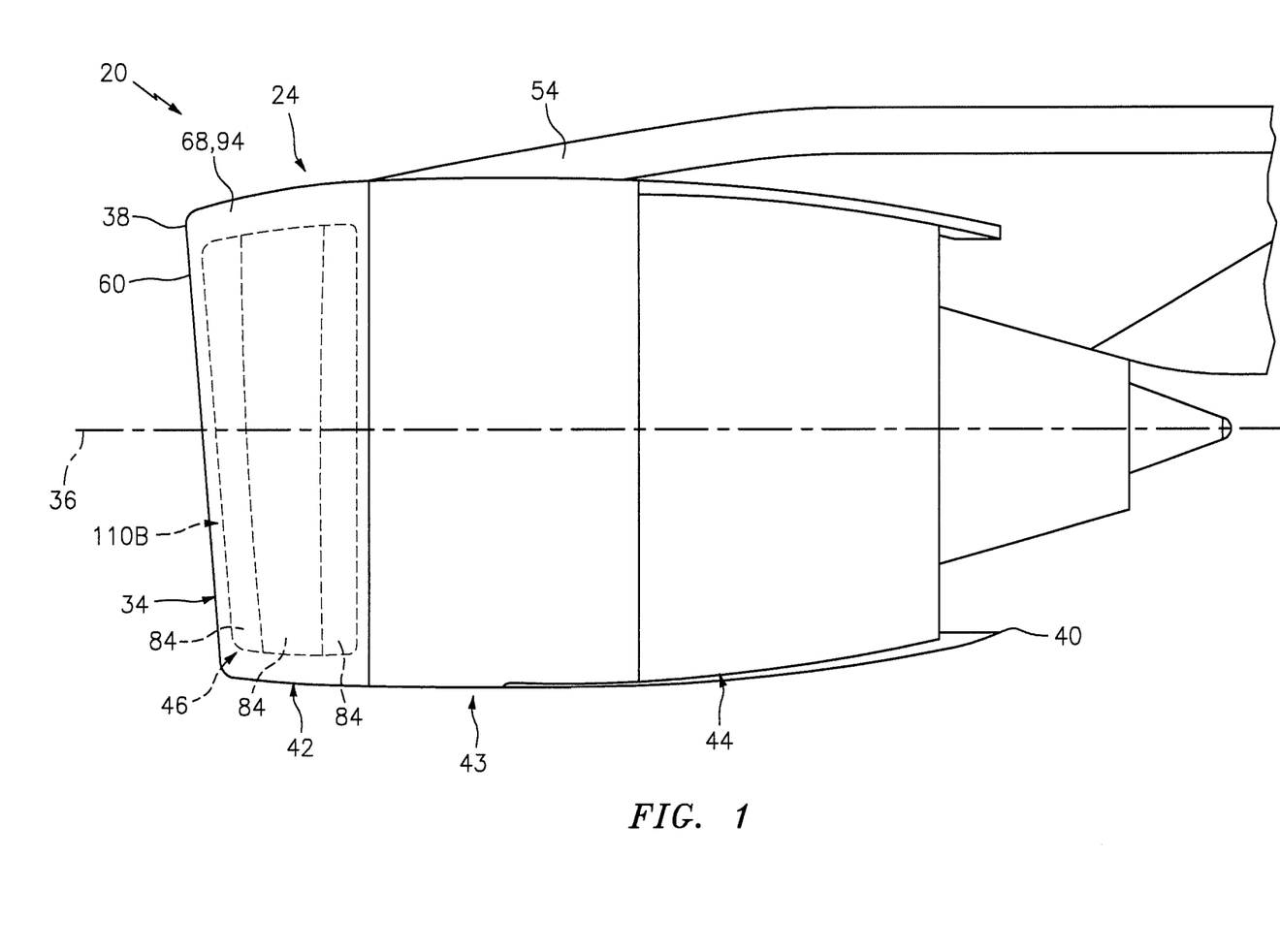
FIG. 1 is a side illustration of a turbine engine aircraft propulsion system.
Figure 2:
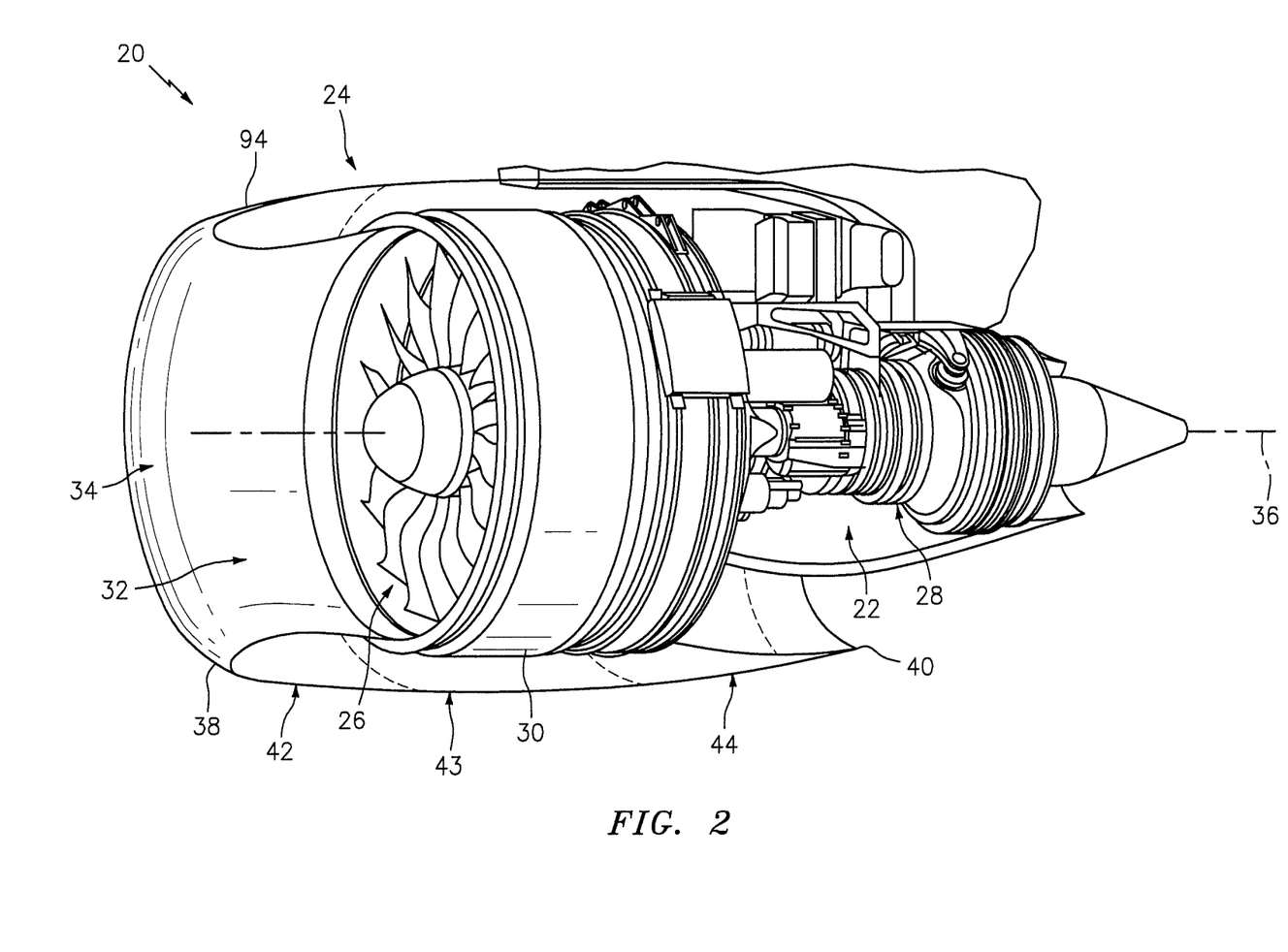
FIG. 2 is a perspective, cutaway illustration of the aircraft propulsion system.

Referring now to FIGS. 1 and 2, an exemplary aircraft propulsion system 20 is illustrated that includes a gas turbine engine 22 housed within a nacelle 24. In the embodiment of FIGS. 1 and 2, the turbine engine 22 is configured as a turbofan engine. The turbine engine 22 of FIG. 2, for example, includes a fan 26 and an engine core 28. The turbine engine core 28 may include low and high pressure compressors, a combustor and high and low pressure turbines.

The fan 26 is configured with an array of fan blades. These fan blades are housed within a tubular fan case 30. The fan case 30 is configured to provide an outer boundary for an axial portion of a gas path 32 extending into the propulsion system 20 from an inlet orifice 34 and through the fan 26. The fan case 30 may also be configured to radially contain one or more of the fan blades and/or fan blade fragments if the blade(s) and/or blade fragment(s) are radially ejected from the fan rotor, for example, after collision with a foreign object.

The nacelle extends along an axis 36 (an axial centerline) between a nacelle forward end 38 and a nacelle aft end 40. The nacelle includes a nacelle inlet 42, which may (or may not) be configured with an active laminar flow control (ALFC) system 46; see also FIG. 3. The nacelle also includes a fan cowl 43 and an aft nacelle structure 44 which may be configured as or with a thrust reverser. These components 42-44 are arranged sequentially along the axis 36 with the nacelle inlet 42 at (e.g., on, adjacent or proximate) the nacelle forward end 38 and with the aft nacelle structure 44 generally towards or at the nacelle aft end 40. The fan cowl 43 is generally axially aligned with the fan 26 and axially overlaps the fan case 30.

The nacelle inlet 42 is configured to guide a stream of air through the inlet orifice 34 and into the turbine engine 22. More particularly, the nacelle inlet 42 is configured to provide a bifurcation between (A) air flowing into the gas path 32 through the inlet orifice 34 and (B) air flowing around and outside of the propulsion system 20. The nacelle inlet 42 may also be configured to create and/or maintain laminar flow of the air flowing outside and adjacent to the nacelle (e.g., adjacent its exterior and radially outer surface 94) as described below in further detail. By promoting and/or extending laminar flow, the nacelle inlet 42 may reduce aerodynamic drag and increase the efficiency of propulsion system 20.

Figure 3:
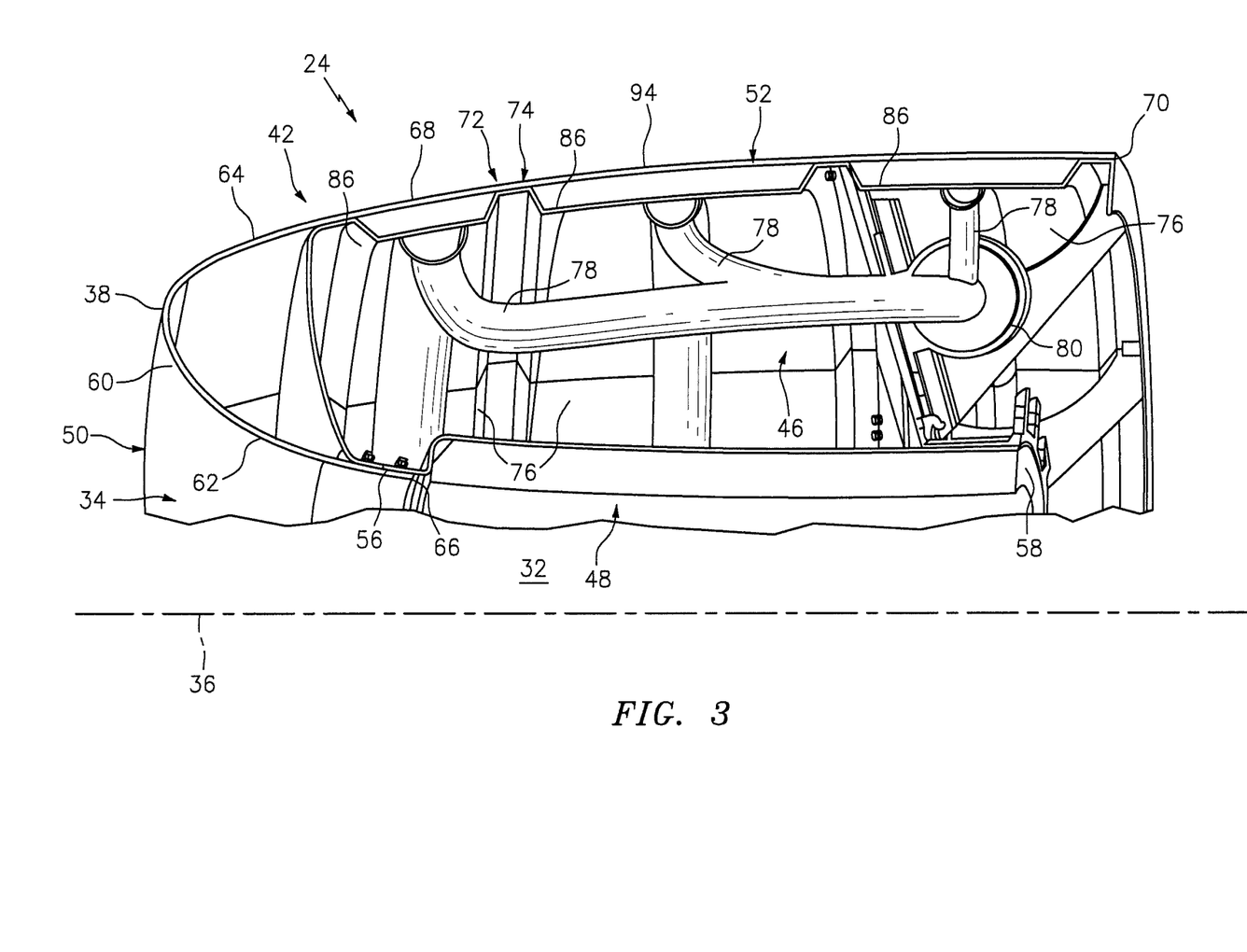
FIG. 3 is a partial, side sectional illustration of a nacelle inlet.
Figure 4:
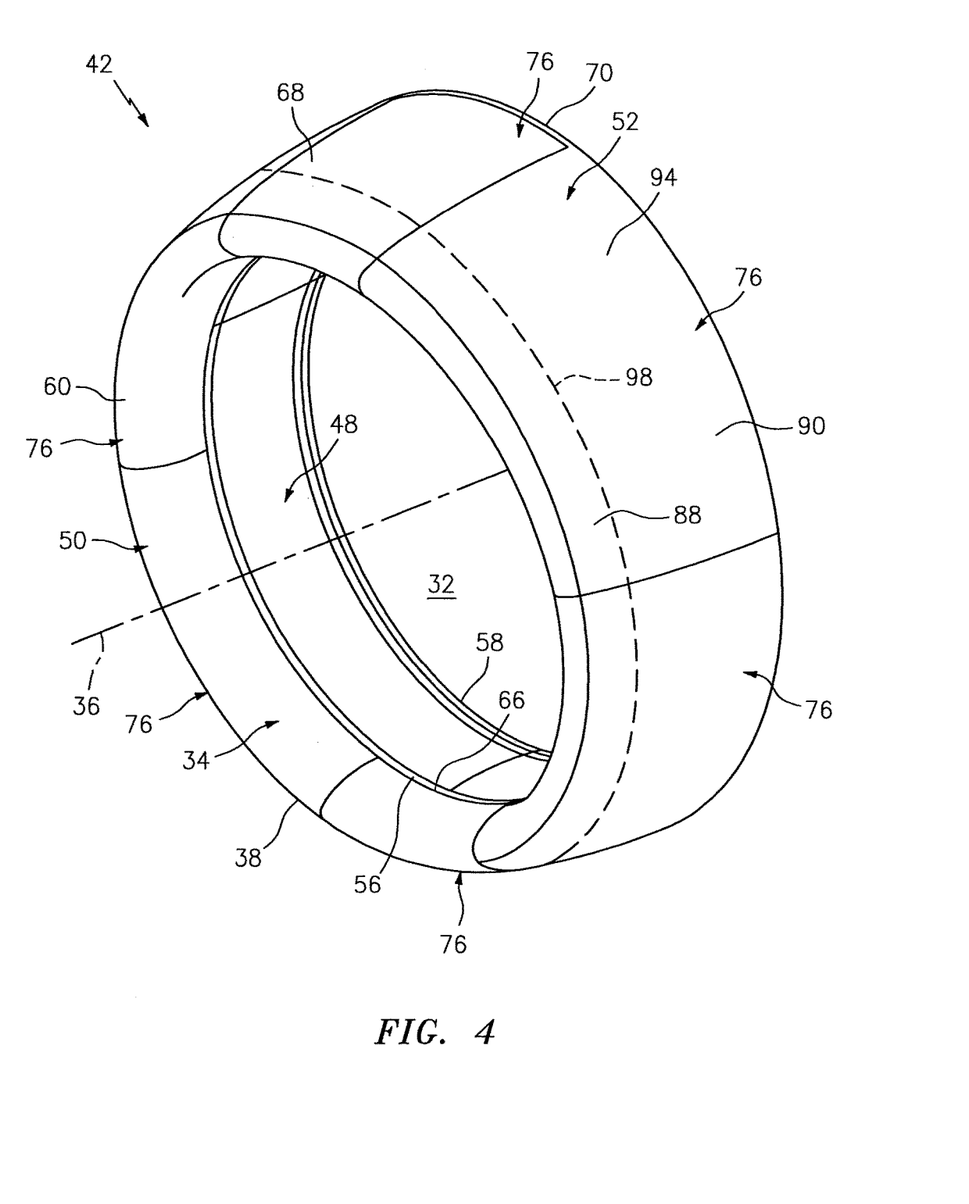
FIG. 4 is a perspective illustration of the nacelle inlet.

Referring to FIGS. 3 and 4, the nacelle inlet 42 includes a tubular acoustic inner barrel 48, an annular inlet lip 50 and a tubular outer barrel 52, which may or may not be circumferentially interrupted by a pylon 54 (see FIG. 1). The inner barrel 48 extends circumferentially around the axis 36. The inner barrel 48 extends axially along the axis 36 between an inner barrel forward end 56 and an inner barrel aft end 58.

The inner barrel 48 may be configured to attenuate noise generated during propulsion system 20 operation and, more particularly for example, noise generated by rotation of the fan 26; e.g., FIG. 2. The inner barrel 48, for example, may include at least one tubular noise attenuating acoustic panel or a circumferential array of arcuate noise attenuating acoustic panels arranged around the axis 36. Of course, various other acoustic panel types and configurations are known in the art and the present disclosure is not limited to any particular ones thereof.

The inlet lip 50 forms a leading edge 60 of the nacelle as well as the inlet orifice 34 to the gas path 32. For aerodynamic reasons, the inlet lip 50 has a cupped (e.g., a generally U-shaped or V-shaped) cross-sectional geometry which extends circumferentially around the axis 36. The inlet lip 50, in particular, includes axially overlapping inner and outer lip portions 62 and 64 as shown in FIG. 3.

The inner lip portion 62 extends axially aft from the outer lip portion 64 at the nacelle forward end 38 and/or the leading edge 60 to the inner barrel 48. An aft end 66 of the inner lip portion 62 is attached to the inner barrel forward end 56 with, for example, one or more fasteners; e.g., rivets, bolts, etc. The inner lip portion 62 may also or alternatively be bonded (e.g., welded, brazed, adhered, etc.) to the inner barrel 48. Of course, the present disclosure is not limited to any particular attachment techniques between the inlet lip 50 and the inner barrel 48.

Figure 5:
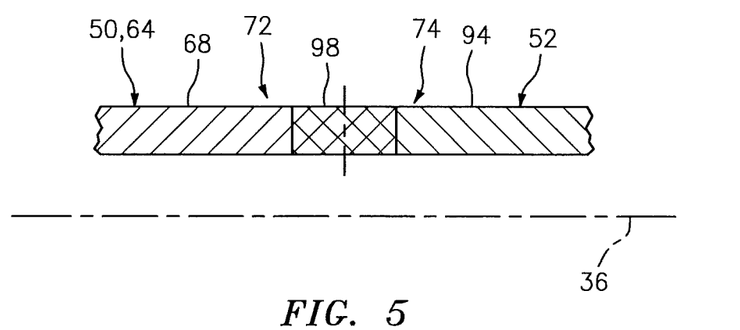
FIG. 5 is a side sectional illustration of a weld joint between an inlet lip portion and an outer barrel portion of the nacelle inlet.

The outer lip portion 64 extends axially aft from the inner lip portion 62 at the nacelle forward end 38 and/or leading edge 60 to the outer barrel 52. The outer lip portion 64 may extend axially aft of the inner lip portion 62 (e.g., see FIG. 8); however, the inlet lip 50 is not limited to such a configuration. The outer lip portion 64 and, for example, the entire inlet lip 50 is formed integral with the outer barrel 52. The inlet lip 50 and the outer barrel 52, for example, is formed to provide an axially monolithic outer skin 68 (e.g., see FIG. 10), which may extend longitudinally from the aft end 66 of the inner lip portion 62 to an aft end 70 of the outer barrel 52. For example, as described below in further detail, the inlet lip 50 or at least a circumferential, arcuate segment thereof may be formed (e.g., machined, shaped, etc.) from a piece of sheet metal. Similarly, the outer skin 68 or at least a circumferential, arcuate segment thereof may be formed from a piece of sheet metal. These preformed (e.g., shaped) pieces of sheet metal may then be friction stir welded or otherwise bonded together to provide the axially monolithic outer skin 68. For example, as shown in FIG. 5, an axial aft end region 72 of the outer lip portion 64 may be friction stir welded to an axial forward end region 74 of the outer barrel 52.

The inlet lip 50 and the outer barrel 52 may be configured as a single monolithic full hoop body. Alternatively, the inlet lip 50 and the outer barrel 52 may be formed from an array of arcuate segments 76 that are attached side-to-side circumferentially about the axis 36 as shown in FIG. 4.

Referring again to FIG. 3, the outer barrel 52 extends circumferentially around the axis 36. The outer barrel 52 is generally axially aligned with and circumscribes the inner barrel 48. The outer barrel 52 extends axially along the axis 36 from the inlet lip 50 and, more particularly, the outer lip portion 64 to the outer barrel aft end 70.

Figure 6:
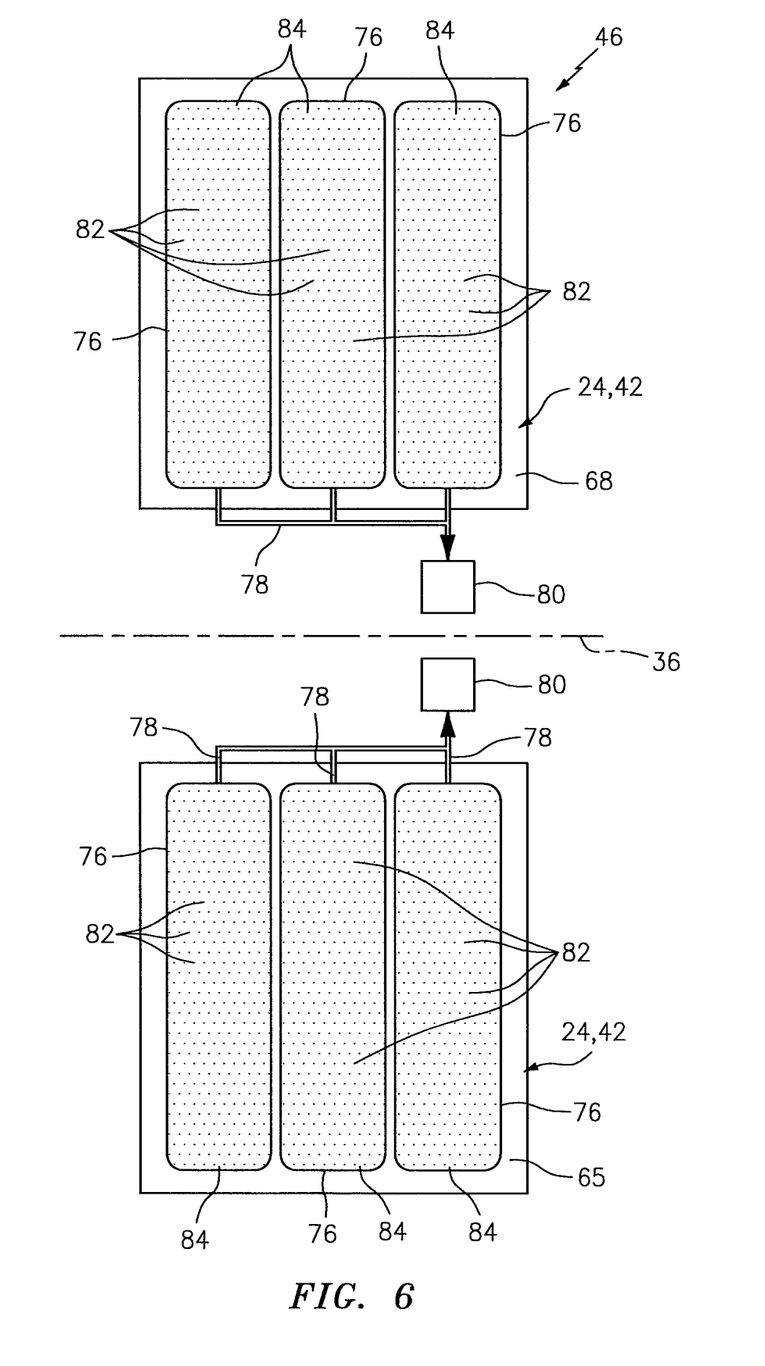
FIG. 6 is a block diagram of an active laminar flow control (ALFC) system for the nacelle inlet.

Referring to FIG. 6, the active laminar flow control (ALFC) system 46 includes one or more plenums 76, one or more conduits 78, and one or more suction sources 80. The ALFC system 46 also includes a plurality of perforations 82 in the nacelle 24 and, more particularly for example, in the outer lip portion 64 and/or the outer barrel 52. These perforations 82 extend through the outer skin 68. The perforations 82 may be arranged into one or more arrays 84.

Referring to FIGS. 3 and 6, each of the plenums 76 may be configured as a duct. One side of this duct may be configured as a respective portion of the perforated outer skin 68. Another side of the duct may configured as a plenum structure 86 connected (e.g., mechanically fastened, friction stir welded and/or otherwise bonded) to the outer skin 68. Each of the plenums 76 is thereby fluidly coupled with a plurality of the perforations 82 in the outer barrel 52.

The plenums 76 are respectively fluidly coupled with the suction source 80 through the conduits 78; e.g., ducts. Each suction source 80 may be configured as a pump or a vacuum with an electric motor; e.g., an electric pump. However, the suction sources 80 are not limited to the foregoing exemplary embodiments; e.g., a vacuum may be produced passively utilizing a venturi device. Each suction source 80 is operable to draw boundary layer air flowing along the outer barrel 52 into the ALFC system 46 so as to actively promote laminar flow adjacent the nacelle 24. More particularly, each suction source 80 is configured to draw boundary layer air flowing along the outer barrel 52 into the plenums 76 through the array of perforations 82. The air within the plenums 76 is then drawn into the suction source 80 through the conduits 78, and is discharged from the suction source 80 through at least one outlet.

The nacelle inlet 42 may be configured from or include a single metallic nacelle inlet structure which defines substantially an entire annular portion (e.g., inlet lip 50 and outer barrel 52) or entirety of the nacelle inlet 42. Alternatively, as illustrated in FIG. 4, the nacelle inlet 42 may be configured from or include a circumferential array of metallic nacelle inlet structures (e.g., segments 76 shown in FIG. 4). Each of these structures may define a circumferential segment of the nacelle inlet 42. These structures may then be circumferentially connected (e.g., mechanically fastened, friction stir welded and/or otherwise bonded) together to define substantially an entire annular portion (e.g., inlet lip 50 and outer barrel 52) or entirety of the nacelle inlet 42. For example, if the inlet is divided into four equal circumferential segments, each segment would span ninety degrees (90°), and when joined together they would form a three hundred and sixty degree (360°) inlet structure.

Figure 7:
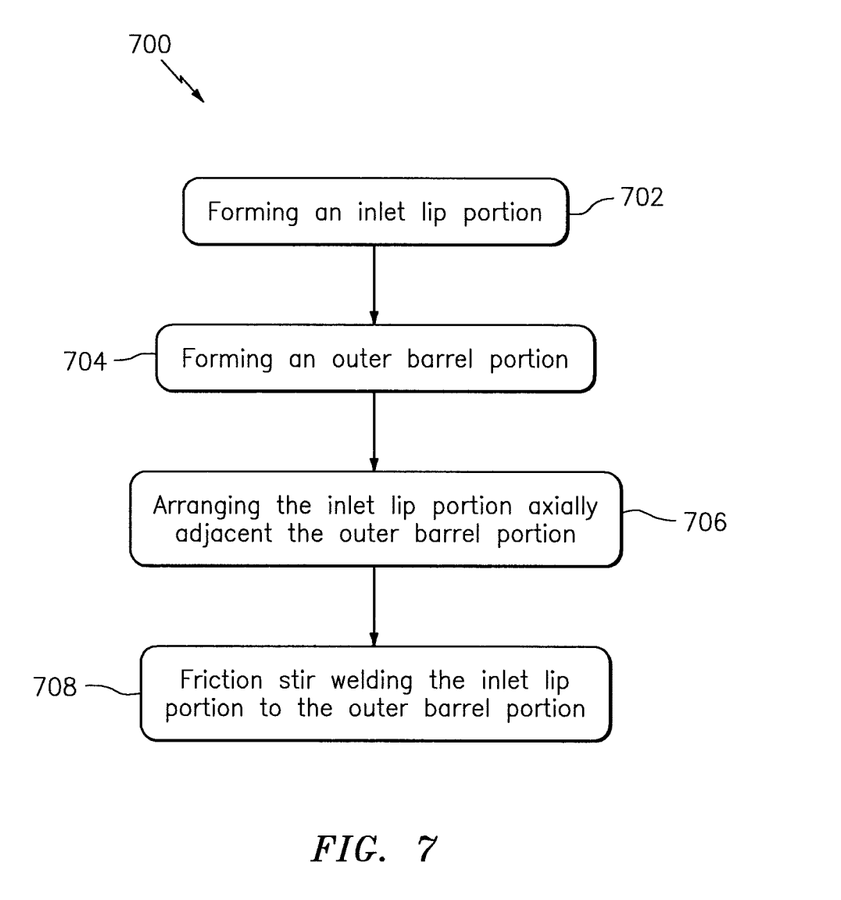
FIG. 7 is a flow diagram for forming a nacelle inlet structure.

FIG. 7 is a flow diagram of a method 700 for forming a metallic nacelle inlet structure such as, but not limited to, the nacelle inlet structure described above. For ease of description, this nacelle inlet structure is described below as including a circumferential segment 88 of the inlet lip 50 (referenced below as "an inlet lip portion") and a circumferential segment 90 of the outer barrel 52 (referenced below as "an outer barrel portion"); e.g., see FIGS. 8-10. Of course, in other embodiments, the inlet lip portion may also or alternatively be an annular portion of the inlet lip 50 (e.g., an axial segment of the inlet lip having a full hoop body), or the entirety of the inlet lip 50. Similarly, the outer barrel portion may also or alternatively be an annular portion of the outer barrel 52 (e.g., an axial segment of the outer barrel having a full hoop body), or the entirety of the outer barrel 52. The nacelle inlet structure may also or alternatively include one or more other components of the nacelle inlet 42; e.g., see FIG. 12.

Figure 8:
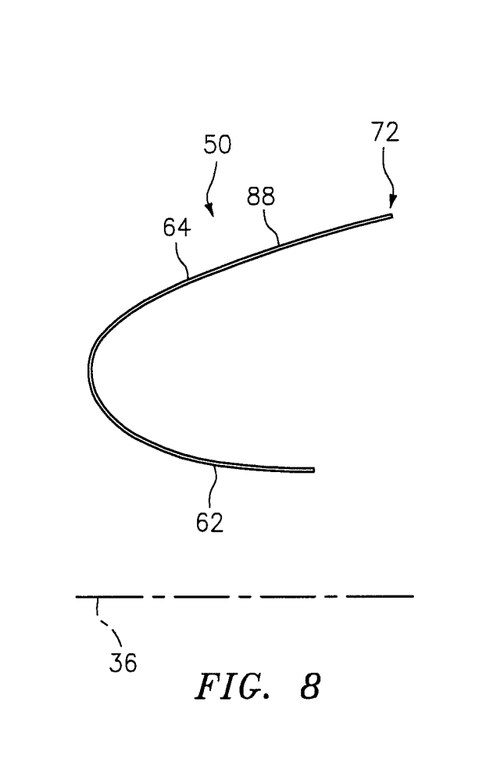
FIG. 8 is a side sectional illustration of the inlet lip portion.

In step 702, the inlet lip portion 88 as shown in FIG. 8 is formed. A sheet of metal material (e.g., sheet metal), for example, may be bent, drawn, pressed, stamped, stretched, forged, hydro-formed, cut, machined, milled or otherwise shaped and/or trimmed to construct a parti-annular (or annular) inlet lip body with a cupped sectional geometry; e.g., see FIGS. 4 and 8. This inlet lip body may be configured as a near-net-shaped circumferential segment of the inlet lip 50; e.g., little or no additional shaping may be required after this faulting step 702. In some embodiments, the sheet of metal material may be shaped using a mandrel or mandrels and/or a die or dies. An exemplary embodiment of such a shaping technique is disclosed in U.S. Pat. No. 7,340,933 to Stewart. The formation step 702 of the present disclosure, however, is not limited to any particular formation techniques.

Figure 9:
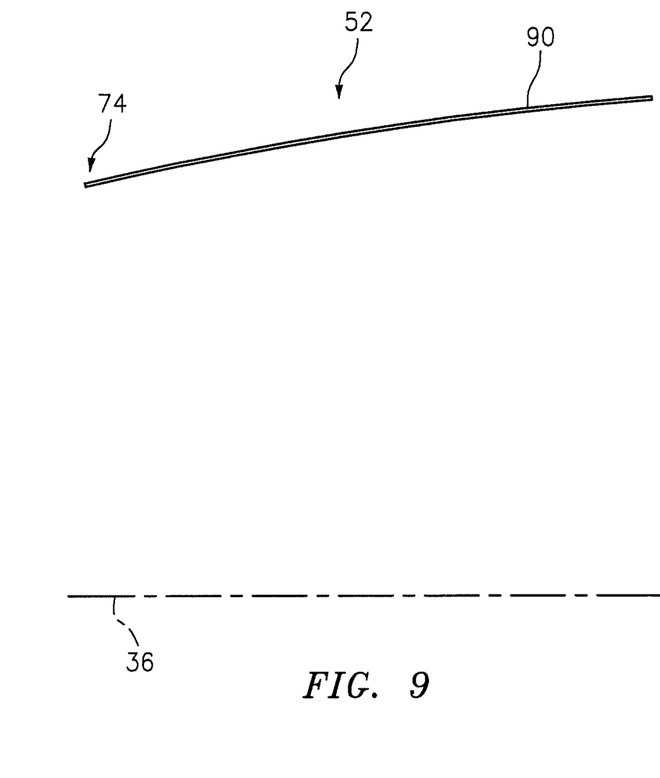
FIG. 9 is a side sectional illustration of the outer barrel portion.

In step 704, the outer barrel portion 90 as shown in FIG. 9 is formed. A sheet of metal material (e.g., sheet metal), for example, may be bent, drawn, pressed, stamped, stretched, forged, hydro-formed, cut, machined, milled or otherwise shaped and/or trimmed to construct a parti-tubular (or tubular) outer barrel body; e.g., see FIGS. 4 and 9. This outer barrel body may be configured as a near-net-shaped circumferential segment of the outer barrel 52; e.g., little or no additional shaping may be required after this forming step 704. The formation step 704 of the present disclosure, however, is not limited to any particular formation techniques.

Figure 10:
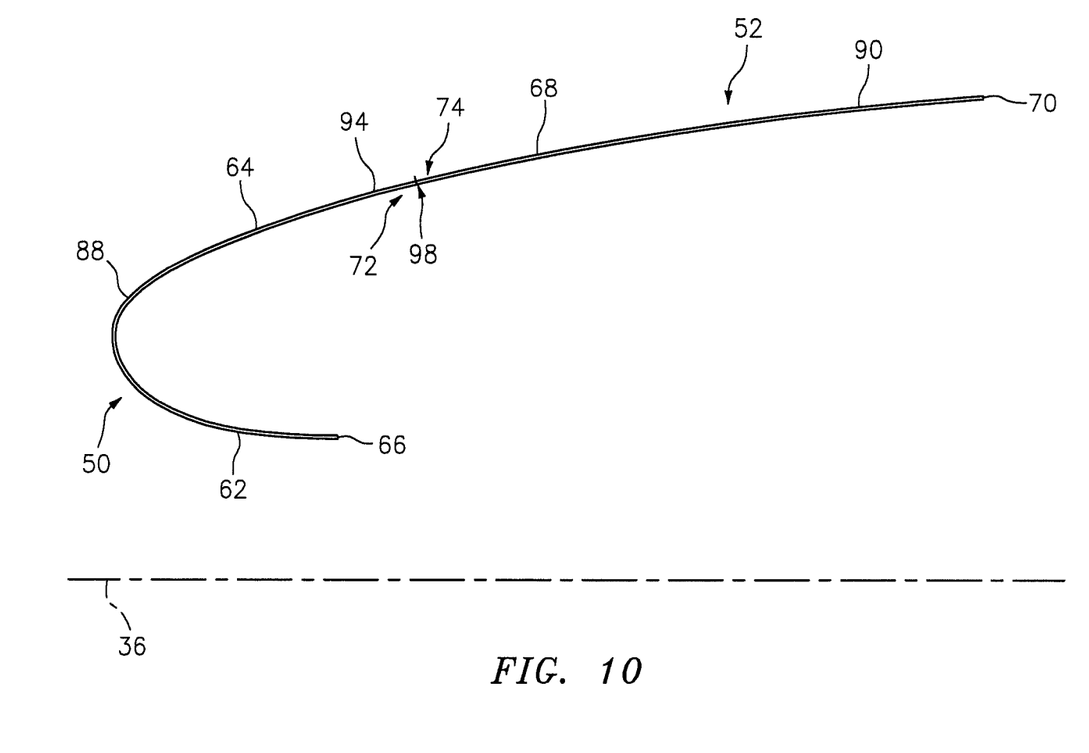
FIG. 10 is a side sectional illustration of the inlet lip portion welded to the outer barrel portion.

In step 706, the inlet lip portion 88 is arranged axially adjacent the outer barrel portion 90 as shown in FIG. 10. In particular, the aft end region 72 of the inlet lip portion 88 is axially abutted against the forward end region 74 of the outer barrel portion 90.

Figure 11:
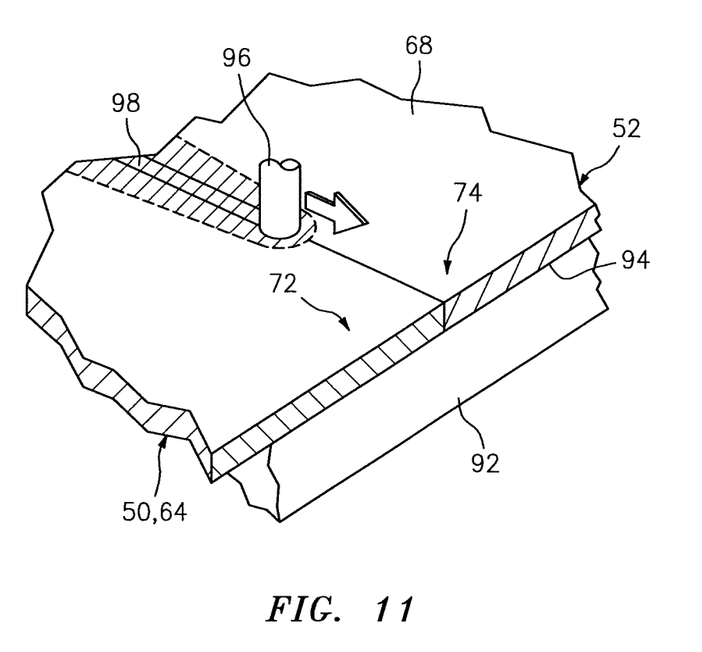
FIG. 11 is a perspective illustration of a tool welding the inlet lip portion to the outer barrel portion.

In step 708, the inlet lip portion 88 is connected to the outer barrel portion 90 as shown in FIG. 11. At least one support device 92, for example, is disposed radially outside of and radially abutted against the outer surface 94 of the inlet lip portion 88 and the outer barrel portion 90. Examples of the support device 92 include, but are not limited to, a die, a jig, a table and a cradle. This support device 92 is configured to align the aft end region 72 of the inlet lip portion 88 with the forward end region 74 of the outer barrel portion 90. The support device 92 may also be configured to provide a smooth support surface against which the inlet lip portion 88 and the outer barrel portion 90 may be pressed during the connecting.

The inlet lip portion 88 is thereafter friction stir welded to the outer barrel portion 90. In particular, a rotating friction stir welding tool 96 (e.g., a rotating quill) is positioned radially within the inlet lip portion 88 and/or the outer barrel portion 90. While the tool 96 is rotating, the tool 96 is radially engaged with the inlet lip portion 88 and/or the outer barrel portion 90 so as to friction stir weld the inlet lip portion 88 to the outer barrel portion 90 while causing minimal or no thermal distortion to those portions 88 and 90. In this manner, a circumferentially extending weld joint 98 is provided between the inlet lip portion 88 and the outer barrel portion 90. In this exemplary embodiment, the weld joint (e.g., 98) between the portions 88 and 90 is located outside of and/or away from (here aft of) a hot zone. This hot zone may be generally aligned with and/or defined by a duct formed by the lip portions 62 and 64, which duct may be configured for flowing hot air for anti-icing purposes. However, in other embodiments, a weld joint such as the joint 98 may be located at the land 100, for example, aft of the bulkhead 102; see dashed line 98'.

As a result of the minimal or no thermal distortion caused by the friction stir welding, the nacelle inlet structure may have a smooth, seamless outer surface 94 at the weld joint 98. This is further facilitated by having the support device 92 abutted against the outer surface 94 of the nacelle inlet structure. Note, the inside surface of the nacelle inlet structure may have a rougher surface than the outer surface 94 due to the direct interaction with the rotating tool 96. Of course, in some embodiments, one or more additional finishing processes may be performed on the outer surface 94 to further enhance/finish the outer surface 94. Examples of such additional finishing processes include, but are not limited to, machining, milling, sanding and polishing.

In some embodiments, the inlet lip portion 88 may be perforated before, during or after the formation step 702 in order to form the respective perforations 82. In addition or alternatively, the outer barrel portion 90 may be perforated before, during or after the formation step 704 in order to form the respective perforations 82. The perforating may be performed using one or more techniques such as, but not limited to, laser drilling, mechanical drilling, chemical milling, media blasting, water jet drilling, etc. Of course, the present disclosure is not limited to utilizing any particular perforation techniques.

Figure 12:
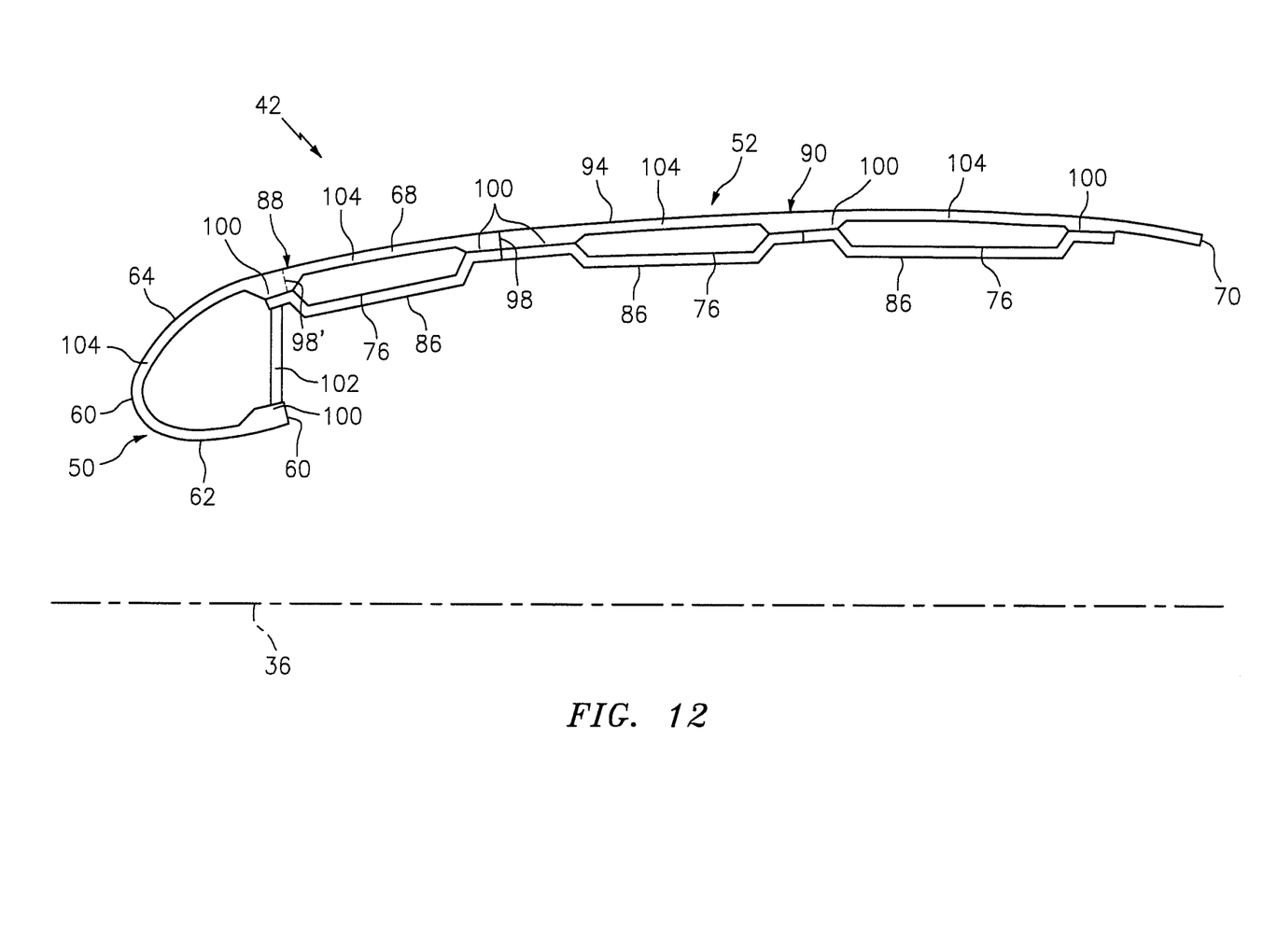
FIG. 12 is a side sectional illustration of another nacelle inlet structure.

In some embodiments, as shown in FIG. 12, the inlet lip portion 88 and/or the outer barrel portion 90 may each be manipulated during its respective formation step 702, 704 to provide that portion with varied thicknesses; e.g., discrete thick regions or land regions. For example, the portion 88, 90 may be chemical and/or mechanically milled to provide that portion 88, 90 with one or more lands 100. One or more of these lands 100 may be located at (e.g., on, adjacent or proximate) an axial end of that portion 88, 90 to facilitate mechanical fastening and/or bonding (e.g., friction stir welding) to another component (e.g., 86, 102). At least one of the lands 100 may also or alternatively be located at an intermediate region of the portion 88, 90 to facilitate mechanical fastening and/or bonding (e.g., friction stir welding) to another component; e.g., a respective plenum structure 86 or bulkhead 102. Each of these lands 100 may have a thickness that is greater than a thickness of an axially adjacent region 104 of the respective portion 88, 90, where one or more of the regions 104 may each include at least one array of the perforations 82.

Figure 13:
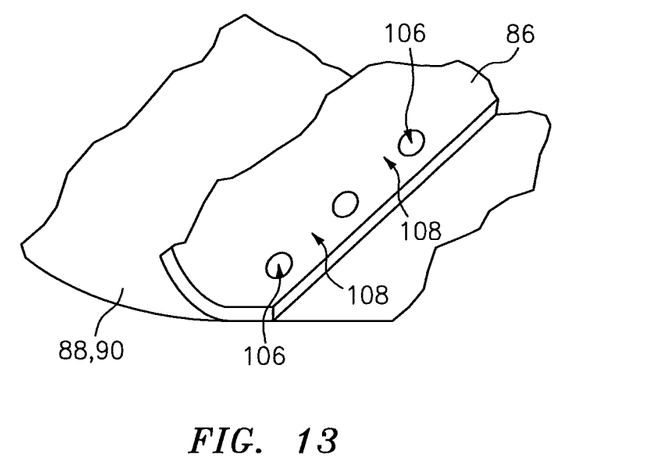
FIG. 13 is a top view illustration of components bonded together by friction stir spot welded joints.

In some embodiments, still referring to FIG. 12, one or more components (e.g., 86, 102) may be friction stir welded, adhered and/or otherwise bonded to the inlet lip portion 88 and/or the outer barrel portion 90. One or more of the plenum structures 86, for example, may be friction stir welded to the inlet lip portion 88 and/or the outer barrel portion 90. In another example, one or more of the bulkheads 102 may be friction stir welded to the inlet lip portion 88 and/or the outer barrel portion 90. The weld joint between the aforementioned components may be continuous or discontinuous, for example friction stir spot welded to provide a plurality of discrete weld joints 106 separated by at least one portion 108 of un-welded seam between the components (e.g., see FIG. 13). Furthermore, the weld joint between the aforementioned components and the portion(s) may be discrete weld joints. Alternatively, one or more of the components may be included with another weld joint; e.g., the portions and the components may be simultaneously friction stir welded together so as to provide a single weld joint. It is worth noting, by bonding these components to the portion(s), the number of fasteners interrupting the outer surface 94 is reduced or may be eliminated.

In some embodiments, the metal material of the inlet lip portion 88 may be the same as the metal material of the outer barrel portion 90. In other embodiments, the metal material of the inlet lip portion 88 may be different than the metal material of the outer barrel portion 90. In this manner, the material (e.g., aluminum 2219 material) for the inlet lip portion 88 may be selected to withstand higher temperatures and/or for higher impact resistance. In contrast, the material (e.g., aluminum 2024 material) for the outer barrel portion 90 may be selected for lighter weight and lower costs. Of course, the nacelle inlet structure is not limited to any particular materials.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

We claim:

1. A method for forming a metallic nacelle inlet structure for a turbine engine aircraft propulsion system with an axis, the nacelle inlet structure comprising an inlet lip portion and an outer barrel portion, the method comprising:
   forming the inlet lip portion;
   forming the outer barrel portion;

arranging the inlet lip portion axially adjacent the outer barrel portion; and friction stir welding the inlet lip portion to the outer barrel portion to provide a circumferentially extending weld joint between the inlet lip portion and the outer barrel portion;

wherein the inlet lip portion is configured with an inner lip portion and an outer lip portion that axially overlaps and circumscribes the inner lip portion; and wherein the friction stir welding comprises friction stir welding an axial aft end region of the outer lip portion to an axial forward end region of the outer barrel portion.

2. The method of claim 1, wherein the nacelle inlet structure has a smooth, seamless outer surface at the weld joint.

3. The method of claim 2, further comprising performing a finishing process to the weld joint to facilitate in provision of the smooth, seamless outer surface at the weld joint.

4. The method of claim 1, wherein the friction stir welding is performed using a rotating tool located radially within the inlet lip portion and the outer barrel portion.

5. The method of claim 4, further comprising disposing a support device radially outside of and abutted against the inlet lip portion and the outer barrel portion during the friction stir welding.

6. The method of claim 1, wherein the fanning of the inlet lip portion comprises shaping material into an annular or parti-annular body with a cupped sectional geometry.

7. The method of claim 1, wherein the forming of the outer barrel portion comprises shaping material into a tubular or parti-tubular body.

8. The method of claim 1, wherein the nacelle inlet structure includes a component and a land which is thicker than another axially adjacent region of the nacelle inlet structure, the land is configured integral with the inlet lip portion or the outer barrel portion, and the component is mechanically fastened to the land.

9. The method of claim 1, wherein the axial aft end region is thicker than another axially adjacent region of the outer lip portion.

10. The method of claim 1, further comprising:
disposing a bulkhead radially between the inner lip portion and the outer lip portion; and
bonding the bulkhead to the outer lip portion.

11. The method of claim 1, further comprising:
perforating the outer lip portion to provide an array of perforations;
disposing a plenum structure radially within the outer lip portion; and
bonding the plenum structure to the outer lip portion;
wherein the plenum structure forms a plenum with at least the outer lip portion, and the plenum is fluidly coupled with the array of perforations.

12. The method of claim 11, wherein a weld joint between the plenum structure and the outer lip portion are formed by friction stir welding, and the weld joint extends circumferentially between the plenum structure and the outer lip portion.

13. The method of claim 1, further comprising:
perforating the outer barrel portion to provide an array of perforations;
disposing a plenum structure radially within the outer barrel portion; and
bonding the plenum structure to the outer barrel portion;
wherein the plenum structure forms a plenum with at least the outer barrel portion, and the plenum is fluidly coupled with the array of perforations.

14. A method for forming a metallic nacelle inlet structure for a turbine engine aircraft propulsion system with an axis, the nacelle inlet structure comprising an inlet lip portion and an outer barrel portion, the method comprising:
forming the inlet lip portion;
forming the outer barrel portion;
arranging the inlet lip portion axially adjacent the outer barrel portion;
friction stir welding the inlet lip portion to the outer barrel portion to provide a circumferentially extending weld joint between the inlet lip portion and the outer barrel portion;
perforating the outer barrel portion to provide an array of perforations;
disposing a plenum structure radially within the outer barrel portion; and
bonding the plenum structure to the outer barrel portion;
wherein the plenum structure forms a plenum with at least the outer barrel portion, and the plenum is fluidly coupled with the array of perforations; and
wherein a weld joint between the plenum structure and the outer barrel portion is formed by friction stir welding, and the weld joint extends circumferentially between the plenum structure and the outer barrel.

15. A method for forming a metallic nacelle inlet structure for a turbine engine aircraft propulsion system with an axis, the nacelle inlet structure comprising an inlet lip portion and an outer barrel portion, the method comprising:
forming the inlet lip portion;
forming the outer barrel portion;
arranging the inlet lip portion axially adjacent the outer barrel portion;
friction stir welding the inlet lip portion to the outer barrel portion to provide a circumferentially extending weld joint between the inlet lip portion and the outer barrel portion;
perforating the outer barrel portion to provide an array of perforations;
disposing a plenum structure radially within the outer barrel portion; and
bonding the plenum structure to the outer barrel portion;
wherein the plenum structure forms a plenum with at least the outer barrel portion, and the plenum is fluidly coupled with the array of perforations; and
wherein a plurality of weld joints between the plenum structure and the outer barrel portion are formed by friction stir spot welding.

16. A method for forming a metallic nacelle inlet structure for a turbine engine aircraft propulsion system with an axis, the nacelle inlet structure comprising an inlet lip portion and an outer barrel portion, the method comprising:
forming the inlet lip portion;
forming the outer barrel portion;
arranging the inlet lip portion axially adjacent the outer barrel portion;
friction stir welding the inlet lip portion to the outer barrel portion to provide a circumferentially extending weld joint between the inlet lip portion and the outer barrel portion;
perforating the outer barrel portion to provide an array of perforations;
disposing a plenum structure radially within the outer barrel portion; and
bonding the plenum structure to the outer barrel portion;

wherein the plenum structure forms a plenum with at least the outer barrel portion, and the plenum is fluidly coupled with the array of perforations;

wherein the bonding comprises friction stir welding; and wherein a weld joint between the plenum structure and the outer barrel portion and the weld joint between the inlet lip portion and the outer barrel portion are concurrently formed and part of a common weld joint.

17. The method of claim 1, wherein the inlet lip portion comprises a first metal and the outer barrel portion comprises a second metal that is different than the first metal.

18. The method of claim 1, wherein the inlet lip portion and the outer barrel portion comprise a common metal.

19. A method for forming a metallic nacelle inlet structure for a turbine engine aircraft propulsion system with an axis, the nacelle inlet structure comprising an inlet lip portion and an outer barrel portion, the method comprising:

arranging the inlet lip portion axially adjacent the outer barrel portion; and friction stir welding the inlet lip portion to the outer barrel portion to provide a weld joint between the inlet lip portion and the outer barrel portion;

wherein the friction stir welding is performed using a rotating tool located radially within the inlet lip portion and the outer barrel portion;

wherein the inlet lip portion is configured with an inner lip portion and an outer lip portion that axially overlaps and circumscribes the inner lip portion; and wherein the friction stir welding comprises friction stir welding an axial aft end region of the outer lip portion to an axial forward end region of the outer barrel portion.

20. The method of claim 19, further comprising disposing a support device radially outside of and abutted against the inlet lip portion and the outer barrel portion during the friction stir welding.

* * * * *

UNITED STATES PATENT AND TRADEMARK OFFICE
CERTIFICATE OF CORRECTION

PATENT NO. : 9,845,728 B2
APPLICATION NO. : 14/884206
DATED : December 19, 2017
INVENTOR(S) : Keith T. Brown et al.

Page 1 of 1

It is certified that error appears in the above-identified patent and that said Letters Patent is hereby corrected as shown below:

In the Specification

Column 6
Line 47, please delete "faulting" and insert --forming--

Column 9
Line 28, please delete "fanning" and insert --forming--

Signed and Sealed this
Thirtieth Day of January, 2018

Joseph Matal
*Performing the Functions and Duties of the*
*Under Secretary of Commerce for Intellectual Property and*
*Director of the United States Patent and Trademark Office*